US010367881B2

(12) United States Patent
Bauer et al.

(10) Patent No.: US 10,367,881 B2
(45) **Date of Patent: *Jul. 30, 2019**

(54) MANAGEMENT OF COMPUTING INFRASTRUCTURE UNDER EMERGENCY PEAK CAPACITY CONDITIONS

(71) Applicants: Nokia of America Corporation, Murray Hill, NJ (US); Alcatel Lucent, Boulogne-Billancourt (FR)

(72) Inventors: Eric J. Bauer, Freehold, NJ (US); John H. Haller, Naperville, IL (US); Frederik G A Vandeputte, West-Vlaanderen (BE)

(73) Assignees: Nokia of America Corporation, Murray Hill, NJ (US); Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,807

(22) Filed: Oct. 29, 2018

(65) Prior Publication Data

US 2019/0068692 A1 Feb. 28, 2019

Related U.S. Application Data

(63) Continuation of application No. 14/684,408, filed on Apr. 12, 2015, now Pat. No. 10,142,401.

(51) Int. Cl.
*G06F 13/00* (2006.01)
*H04L 29/08* (2006.01)
(Continued)

(52) U.S. Cl.
CPC .......... *H04L 67/10* (2013.01); *H04L 41/0896* (2013.01); *H04L 41/5025* (2013.01); *H04L 43/0817* (2013.01); *H04L 41/5096* (2013.01)

(58) Field of Classification Search
CPC . H04L 67/10; H04L 41/5025; H04L 43/0817; H04L 41/0896; H04L 41/5096
(Continued)

(56) References Cited

U.S. PATENT DOCUMENTS 8,719,627 B2 5/2014 Watson et al.
9,009,677 B2 4/2015 Zhao
(Continued)

FOREIGN PATENT DOCUMENTS

WO WO 2014/130972 8/2014

OTHER PUBLICATIONS

U.S. Appl. No. 14/684,408, filed Apr. 12, 2015.

*Primary Examiner* — Kenneth R Coulter
(74) *Attorney, Agent, or Firm* — Tong, Rea, Bentley & Kim, LLC

(57) ABSTRACT

A capability for management of computing infrastructure under emergency peak capacity conditions is presented. The capability for management of computing infrastructure under emergency peak capacity conditions may support configuration of computing infrastructure to provide additional computing capacity for the emergency peak capacity conditions. The computing infrastructure may include capacity supporting equipment configured to provide computing capacity of the computing infrastructure and environmental equipment configured to support operation of the capacity supporting equipment. The configuration of computing infrastructure to support additional computing capacity for an emergency peak capacity condition may include configuration of capacity supporting equipment to operate in emergency operating mode, rather than normal operating mode, to support the additional computing capacity for the emergency peak capacity condition. The configuration of cloud computing infrastructure to provide additional com-
(Continued)

puting capacity for an emergency peak capacity condition may include configuration of environmental equipment to support operation of capacity supporting equipment in emergency operating mode.

22 Claims, 3 Drawing Sheets

(51) Int. Cl.
*H04L 12/24* (2006.01)
*H04L 12/26* (2006.01)

(58) Field of Classification Search
USPC ................................ 709/224, 223, 220–222
See application file for complete search history.

(56) References Cited

U.S. PATENT DOCUMENTS

| | | | | |
|---|---|---|---|---|
| 9,183,102 | B2 | 11/2015 | Bauer | |
| 9,563,226 | B2 * | 2/2017 | Jagmag | G06F 1/04 |
| 10,142,401 | B2 * | 11/2018 | Bauer | H04L 67/10 |
| 2003/0177176 | A1 | 9/2003 | Hirschfeld et al. | |
| 2013/0086411 | A1 | 4/2013 | Bauer | |
| 2014/0183957 | A1 | 7/2014 | Duchesneau | |
| 2014/0282425 | A1 | 9/2014 | Zhao | |
| 2015/0082076 | A1 * | 3/2015 | Jagmag | G06F 1/04 713/600 |

* cited by examiner

MANAGEMENT OF COMPUTING INFRASTRUCTURE UNDER EMERGENCY PEAK CAPACITY CONDITIONS

CROSS-REFERENCE TO RELATED APPLICATIONS

This application is a continuation of U.S. patent application Ser. No. 14/684,408, filed on Apr. 12, 2015, now U.S. Pat. No. 10,142,401, entitled MANAGEMENT OF COMPUTING INFRASTRUCTURE UNDER EMERGENCY PEAK CAPACITY CONDITIONS, which is hereby incorporated herein by reference.

TECHNICAL FIELD

The disclosure relates generally to computing infrastructure and, more specifically but not exclusively, to management of computing infrastructure under emergency peak capacity conditions.

BACKGROUND

Cloud computing providers deploy, operate, and maintain cloud computing infrastructure which may be used to provide many types of cloud-based services, such as infrastructure-as-a-service (IaaS), platform-as-a-service (PaaS), software-as-a-service (SaaS), and so forth. The cloud computing infrastructure may include capacity support equipment, environmental equipment configured to support operation of the capacity supporting equipment, and so forth. Disadvantageously, however, capital and operational costs incurred by cloud computing providers to deploy, operate, and maintain cloud computing infrastructure can be significant.

SUMMARY OF EMBODIMENTS

Various deficiencies in the prior art are addressed by embodiments for management of computing infrastructure, including cloud computing infrastructure or other types of computing infrastructure, under emergency peak capacity conditions.

In at least some embodiments, an apparatus includes a processor and a memory communicatively connected to the processor, wherein the processor is configured to detect an emergency peak capacity condition associated with a computing environment including capacity supporting equipment configured to provide computing capacity within the computing environment and environmental equipment configured to control environmental conditions of an environment within which the capacity supporting equipment operates and initiate a management action for configuring an element of the capacity supporting equipment to provide additional computing capacity for the emergency peak capacity condition.

In at least some embodiments, a non-transitory computer-readable storage medium stores instructions which, when executed by a processor, cause the processor to perform a method that include detecting an emergency peak capacity condition associated with a computing environment including capacity supporting equipment configured to provide computing capacity within the computing environment and environmental equipment configured to control environmental conditions of an environment within which the capacity supporting equipment operates and initiating a management action for configuring an element of the capacity supporting equipment to provide additional computing capacity for the emergency peak capacity condition.

In at least some embodiments, a method includes detecting, via a processor, an emergency peak capacity condition associated with a computing environment comprising capacity supporting equipment configured to provide computing capacity within the computing environment and environmental equipment configured to control environmental conditions of an environment within which the capacity supporting equipment operates and initiating a management action for configuring an element of the capacity supporting equipment to provide additional computing capacity for the emergency peak capacity condition.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements that are common to the figures.

DETAILED DESCRIPTION OF EMBODIMENTS

Figure 1:
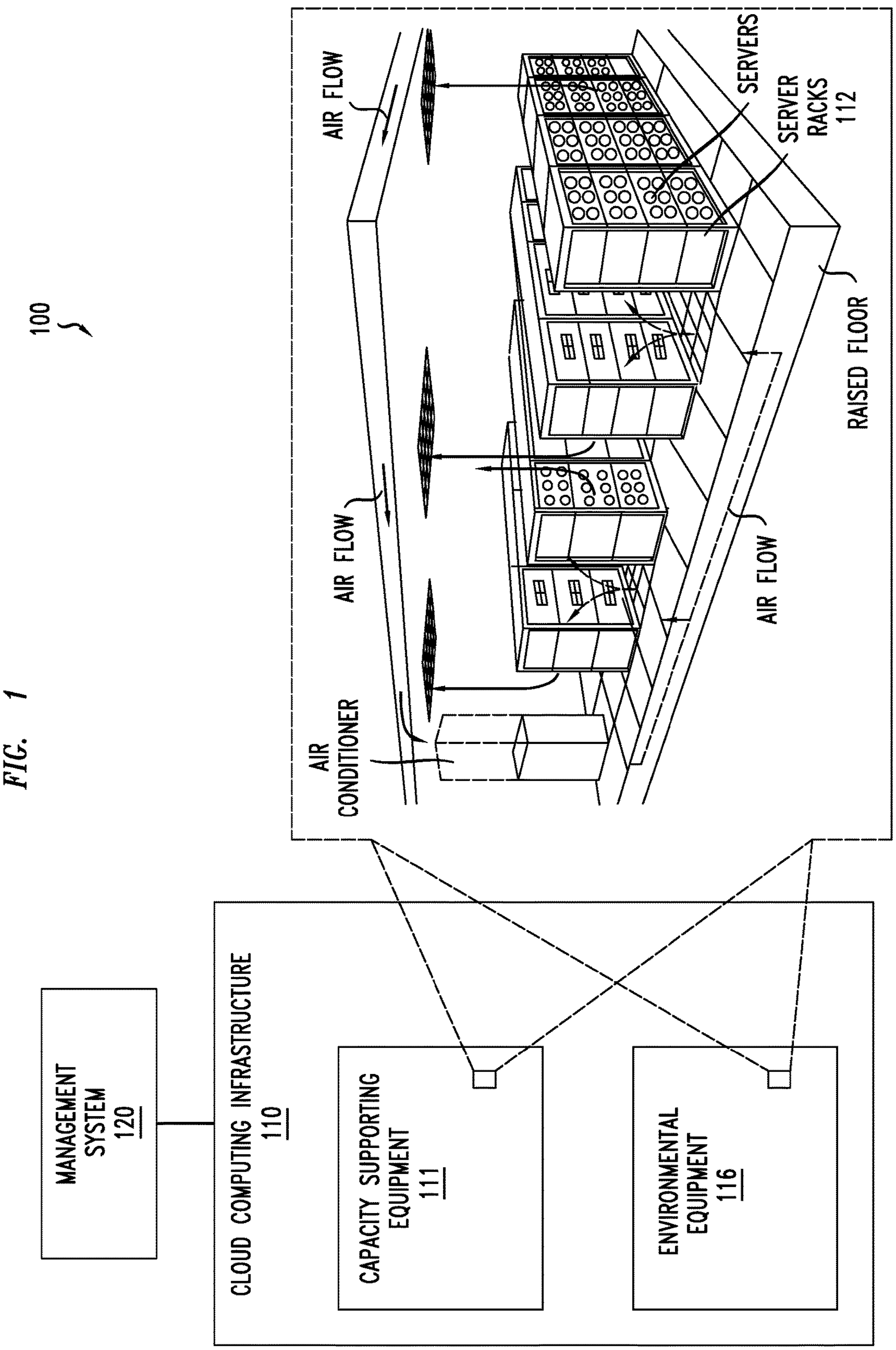
FIG. 1 depicts an exemplary system including cloud computing infrastructure and a management system configured to manage the cloud computing infrastructure.

A capability for management of computing infrastructure under emergency peak capacity conditions is presented. The capability for management of computing infrastructure under emergency peak capacity conditions may support configuration of computing infrastructure to provide additional computing capacity for the emergency peak capacity conditions. The computing infrastructure may include capacity supporting equipment configured to provide computing capacity of the computing infrastructure and environmental equipment configured to support operation of the capacity supporting equipment (e.g., to provide cooling for the capacity supporting equipment). The configuration of computing infrastructure to support additional computing capacity for an emergency peak capacity condition may include configuration of capacity supporting equipment to operate in emergency operating mode, rather than normal operating mode, to support the additional computing capacity for the emergency peak capacity condition. The configuration of cloud computing infrastructure to provide additional computing capacity for an emergency peak capacity condition may include configuration of environmental equipment to support operation of capacity supporting equipment in emergency operating mode (e.g., to provide additional cooling for the capacity supporting equipment that is providing the additional computing capacity for the emergency peak capacity condition). The capability for management of computing infrastructure under emergency peak capacity conditions, by configuring capacity supporting equipment to operate in emergency operating mode in order to support the additional computing capacity for the emergency peak capacity condition, enables the computing infrastructure to be engineered based on normal peak capacity conditions (e.g., cyclic peak capacity conditions) rather than emergency peak capacity conditions (namely, without deploying additional capacity supporting equipment to handle emergency peak capacity conditions under normal operating conditions of the capacity supporting equipment when emergency peak capacity conditions are expected to be relatively rare and relatively short-lived), thereby reducing expenditures incurred by the computing infrastructure provider. It is noted that the capability for management of computing infrastructure under emergency peak capacity conditions may be applied to various types of computing infrastructure, such as cloud computing infrastructure, non-cloud-based computing infrastructure (e.g., non-cloud datacenter computing infrastructure, non-cloud central office computing infrastructure, or the like), high performance computing (HPC) supercomputer infrastructure, or the like. These and various other embodiments and potential advantages of the capability for management of computing infrastructure under emergency peak capacity conditions may be further understood by way of reference to an exemplary system in which the capability for management of computing infrastructure under emergency peak capacity conditions is applied to cloud computing infrastructure, as depicted and described with respect to FIG. 1.

FIG. 1 depicts an exemplary system including cloud computing infrastructure and a management system configured to manage the cloud computing infrastructure.

The exemplary system 100 includes cloud computing infrastructure 110 and a management system 120 configured to manage cloud computing infrastructure 110.

The cloud computing infrastructure 110 may be configured to support various types of cloud-based services, such as infrastructure-as-a-service (IaaS), platform-as-a-service (PaaS), software-as-a-service (SaaS), and so forth. The cloud-based services may be supported by cloud resources, which may include physical resources and associated virtual resources supported by those physical resources. The cloud-based services may include various types of cloud-based applications which may be supported by the cloud resources, such as e-mail applications, virtual desktop applications, virtual collaboration applications, and many others. The cloud computing infrastructure 110 may include various types of equipment which may be used to support cloud-based services. As depicted in FIG. 1, cloud computing infrastructure 110 includes capacity supporting equipment 111 and environmental equipment 116.

The capacity supporting equipment 111 includes physical resources supporting the cloud-based services. The capacity supporting equipment 111 includes various elements configured to provide computing capacity for supporting the cloud-based services. For example, capacity supporting equipment 111 may include elements such as processors, memories, storage devices, server blades, servers, communication equipment (e.g., top-of-rack switches, aggregating switches, communication links, or the like), or the like, as well as various combinations thereof. It will be appreciated that physical resources of capacity supporting equipment 111 may be used to provide various virtual resources which may be used to support cloud-based services (e.g., virtual processor resources, virtual memory resources, virtual storage resources, virtual communication resources, virtual machines (VMs), or the like, as well as various combinations thereof) and, thus, that the computing capacity supported by capacity supporting equipment 111 may be used to support various types of virtual capacity (e.g., virtual processing capacity, virtual memory capacity, virtual storage capacity, VM capacity, or the like, as well as various combinations thereof).

The environmental equipment 116 includes equipment configured to control environmental conditions in which the capacity supporting equipment 111 operates. For example, environmental equipment 116 may include one or more air conditioning units and one or more association controllers (e.g., one or more thermostats or other suitable controllers) for controlling the one or more air conditions units to control temperatures in locations in which the capacity supporting equipment 111 operates (e.g., a central thermostat or other controller configured to control temperatures throughout the building in which capacity supporting equipment 111 operates, one or more thermostats or other controllers configured to control temperatures in multiple zones in which respective portions of capacity supporting equipment 111 operate, or the like). For example, environmental equipment 116 may include one or more fans and one or more association controllers for controlling the one or more fans in order to circulate air to control temperatures in locations in which the capacity supporting equipment 111 operates (e.g., a set of overhead fans configured to circulate air and provide cooling throughout the building in which capacity supporting equipment 111 operates, fans deployed to circulate air and provide cooling along aisles between racks of capacity supporting equipment 111 where capacity supporting equipment 111 is deployed using rows of racks within aisles therebetween, or the like). For example, environmental equipment 116 may one or more liquid or gas coolant circulation mechanisms and one or more associated controllers for controlling circulation of liquid or gas to control temperatures in locations in which the capacity supporting equipment 111 operates. For example, environmental equipment 116 may be considered to include one or more active cooling mechanisms of capacity supporting equipment 111. It will be appreciated that the environmental equipment 116 may include various other types of cooling mechanisms and associated controllers for controlling operation of the cooling mechanisms to control temperatures in locations in which the capacity supporting equipment 111 operates. The types and arrangements of environmental equipment 116 to support cooling for capacity supporting equipment 111 of cloud computing infrastructure 110 will be understood by one skilled in the art.

The cloud computing infrastructure 110 may be deployed in any suitable location or locations. For example, the cloud computing infrastructure 110 may be deployed at a single location (e.g., within a single datacenter, within a single central office, or the like), at multiple locations (e.g., at multiple locations which may include datacenters, central offices, or other suitable types of locations), or the like. The cloud computing infrastructure 110 may be arranged at the location(s) in various ways, as discussed further below.

In FIG. 1, cloud computing infrastructure 110 is depicted as being arranged at a single location in a particular arrangement; however, it will be appreciated that cloud computing infrastructure 110 may be arranged in various other ways. In FIG. 1, capacity supporting equipment 111 is depicted as being composed of sets of servers being arranged in server racks 112. The server racks are arranged so as to form aisles, where the aisles alternate between so called "cool" (or "front") aisles and so called "hot" (or "back") aisles. In FIG. 1, the environmental equipment 116 is depicted as being air conditioning equipment arranged in a bottom-to-top cooling arrangement in which capacity supporting equipment 111 is arranged on a raised floor such that cool air provided by the air conditioning equipment is circulated under the raised floor, enters the server racks 112 at the bottom of the server racks 112, and exits the server racks 112 at the top of the server racks. It will be appreciated that this is merely one possible arrangement of the capacity supporting equipment

111 and the environmental equipment 116 within a datacenter, central office, or other suitable location in which cloud computing infrastructure 110 may be deployed. It also will be appreciated that the cloud computing infrastructure 110 for which management system 120 provides management functions may be deployed across multiple (and potentially geographically distributed) locations.

The cloud computing infrastructure 110 is engineered based on normal peak capacity conditions (e.g., cyclic peak capacity conditions), rather than emergency peak capacity conditions, and is expected to support emergency peak capacity conditions using management actions initiated by management system 120, as discussed further below. It is noted that an emergency peak capacity condition experienced by cloud computing infrastructure 110 may be a condition that pushes the demand for computing capacity of the cloud computing infrastructure 110 above the normal peak capacity conditions of the cloud computing infrastructure 110 (e.g., an expected event that pushes the demand for computing capacity of the cloud computing infrastructure 110 higher than expected for the event and into emergency peak capacity levels, an unexpected event that results in emergency peak capacity conditions (e.g., a disaster or other unexpected event), or the like). In other words, the cloud computing infrastructure provider, rather than deploying cloud computing infrastructure 110 that is sufficient to handle emergency peak capacity conditions under normal operating conditions of the cloud computing infrastructure 110, deploys cloud computing infrastructure 110 that is sufficient to handle only normal peak capacity conditions under normal operating conditions of the cloud computing infrastructure 110 and the management system 120 is configured to operate various portions of the cloud computing infrastructure 110 under emergency operating conditions in order to handle emergency peak capacity conditions. It will be appreciated that engineering of the cloud computing infrastructure 110 in this manner reduces the amount of cloud computing infrastructure 110 that is deployed by the cloud computing infrastructure provider and, thus, enables the cloud computing infrastructure provider to reduce capital expenditures (e.g., for equipment, software licenses, floor space, and other capital expenditures) and operational expenditures (e.g., electricity, cooling, and other operational expenditures associated with running and maintaining the cloud computing infrastructure 110), that would otherwise be incurred if additional cloud computing infrastructure 110 was deployed to handle emergency peak capacity conditions.

The management system 120 may be configured to support operation of the cloud computing infrastructure 110 in a normal operating mode as well as in an emergency operating mode. In general, operation of the cloud computing infrastructure 110 in a normal operating mode to support normal peak capacity conditions may be considered to be operation of the cloud computing infrastructure 110 in a manner that enables support for normal peak capacity conditions without a reduction in the reliability or the useful service life of the cloud computing infrastructure 110, whereas operation of the cloud computing infrastructure 110 in an emergency operating mode to support emergency peak capacity conditions may be considered to be operation of the cloud computing infrastructure 110 in a manner that enables support for emergency peak capacity conditions at the expense of potential reductions in the reliability or the useful service life of the cloud computing infrastructure 110. It is noted that the engineering of the cloud computing infrastructure 110 based on normal peak capacity conditions and operation of the cloud computing infrastructure 110 in emergency operating mode to support emergency peak capacity conditions, as discussed above, enables the cloud computing infrastructure provider to deploy less cloud computing infrastructure 110 (and, thus, reduce costs) while still handling emergency peak capacity conditions.

The management system 120 is configured to perform capacity management functions for cloud computing infrastructure 110. The management system 120 is configured to communicate with cloud computing infrastructure 110 for purposes of performing capacity management functions for cloud computing infrastructure 110. In FIG. 1, for purposes of clarity, this is depicted as a single, direct connection between management system 120 and cloud computing infrastructure 110; however, it will be appreciated that communication between management system 120 and cloud computing infrastructure 110 may be supported using any suitable number of direct or indirect connections or communication paths between management system 120 and cloud computing infrastructure 110. The management system 120 may be configured to communicate with cloud computing infrastructure 110 via various types of communication networks, such that the management system 120 may be co-located with some or all of cloud computing infrastructure 110 (e.g., co-located within a datacenter, central office, or other suitable location), located remotely from some or all of cloud computing infrastructure 110, or the like. The management system 120 may be configured to communicate with various elements of the cloud computing infrastructure 110, including elements of capacity supporting equipment 111 (e.g., servers, server blades, processors, memories, storage devices, communications devices, or the like) and elements of environmental equipment 116 (e.g., air conditioning units, thermostats that control air conditioning units, fans, controllers that control fans, controllers that control coolant circulation mechanisms, or the like).

The management system 120 is configured to detect an emergency peak capacity condition associated with capacity supporting equipment 111 and to enable the capacity supporting equipment 111 to provide additional computing capacity for the emergency peak capacity condition by initiating one or more management actions.

The management system 120 may be configured to detect an emergency peak capacity condition associated with the capacity supporting equipment 111 based on information available locally at management system 120 (e.g., infrastructure demand monitoring information where the management system 120 is configured to provide infrastructure demand monitoring functions for cloud computing infrastructure 110, traffic monitoring information where the management system 120 is configured to provide traffic monitoring functions for cloud computing infrastructure 110, or the like), information received from one or more other management systems (e.g., from an infrastructure demand monitoring system configured to provide infrastructure demand monitoring functions for cloud computing infrastructure 110, from a load balancer providing load balancing functions for cloud computing infrastructure 110, or the like), or the like, as well as various combinations thereof. The emergency peak capacity condition detected by the management system 120 may be an actual emergency peak capacity condition that is currently occurring on the cloud computing infrastructure 110, a predicted emergency peak capacity condition that is predicted to occur on the cloud computing infrastructure 110, or the like).

The management system 120 may be configured to initiate various types of management actions for enabling the capacity supporting equipment 111 to provide additional computing capacity for the emergency peak capacity condition detected by management system 120. The one or more management actions may include one or more capacity-based management actions, one or more environmental-based management actions, or a combination thereof. For example, the one or more capacity-based management actions may include one or more actions which enable capacity supporting equipment 111 to temporarily provide additional computing capacity for the emergency peak capacity condition (e.g., enabling overclocking of a server or other capacity supporting equipment 111, raising a supply voltage of a server or other capacity supporting equipment 111, raising a maximum acceptable temperature of a server or other capacity supporting equipment 111 closer to its stability limit (e.g., maximum acceptable junction temperature, maximum acceptable temperature measured by one or more sensors at one or more other locations, or the like), or the like, as well as various combinations thereof). For example, the one or more environmental-based management actions may include one or more actions which enable environmental equipment 116 to temporarily provide additional cooling in order to support operation of capacity supporting equipment 111 in temporarily providing additional computing capacity for the emergency peak capacity condition (e.g., lowering the temperature of a location at which capacity supporting equipment 111 is deployed, lowering the temperature of a particular area or areas of a location at which capacity supporting equipment 111 is deployed (e.g., lowering the inlet temperature(s) of one or more server racks, the inlet temperatures of one or more aisles of server racks, or the like), controlling one or more fans to provide additional cooling for capacity supporting equipment 111, controlling one or more coolant circulation mechanisms to provide additional cooling for capacity supporting equipment 111, controlling one or more active cooling mechanisms of capacity supporting equipment 111 to provide additional cooling for the capacity supporting equipment 111, or the like, as well as various combinations thereof). The management system 120 may be configured to initiate various other management actions for enabling the capacity supporting equipment 111 to handle an emergency peak capacity condition detected by management system 120.

In at least some embodiments, management system 120 is configured to initiate one or more capacity-based management actions for increasing the computing capacity provided by capacity supporting equipment 111 while also initiating one or more environmental-based management actions for increasing cooling provided by environmental equipment 116 in order to offset the increase in temperatures resulting from increasing the computing capacity provided by capacity supporting equipment 111. As discussed above, increasing the computing capacity provided by capacity supporting equipment 111 is expected to cause the operating temperature of the capacity supporting equipment 111 to increase (which could decrease the reliability of the capacity supporting equipment 111, result in damage to the capacity supporting equipment 111, materially shorten the service lifetime of the capacity supporting equipment 111, and so forth), such that it may be desirable to increase the cooling provided by environmental equipment 116 in order to offset the increase in temperatures resulting from increasing the computing capacity provided by capacity supporting equipment 111. In other words, when pushing capacity supporting equipment 111 harder in order to increase capacity to a level sufficient to handle an emergency peak capacity condition, it also may be beneficial to push associated environmental equipment 116 harder to expel the increased heat produced by the capacity supporting equipment 111 from pushing the capacity supporting equipment 111 harder. For example, management system 120 may send a message to a server in order to configure the server to perform overclocking to increase its capacity and also send a message to a fan that is circulating air near the server (e.g., to modify one or more operating parameters of the fan, such as increasing a fan speed of the fan, changing a direction of the fan, or the like) in order to configure the fan to help dissipate additional heat resulting from the server performing overclocking. For example, management system 120 may send messages to multiple different servers located in multiple different areas of a datacenter to configure the servers to increase their supply voltages and also send a message to a thermostat controlling the ambient temperature of the datacenter to lower the ambient temperature of the datacenter in order to help dissipate additional heat in the regions of the servers that results from the servers operating at higher supply voltages. For example, management system 120 may send a message to a server to configure the server to raise its maximum acceptable temperature closer to the stability limit of the server and also send a message to the server to operate an active cooling mechanism of the server in a manner for dissipating additional heat resulting from the server raising its maximum acceptable temperature closer to the stability limit of the server. It will be appreciated that various other combinations of capacity-based management actions and environmental-based management actions may be performed for increasing the computing capacity provided by capacity supporting equipment 111 while also increasing cooling provided by environmental equipment 116 in order to offset the increase in temperatures resulting from increasing the computing capacity provided by capacity supporting equipment 111. The management actions initiated to increase the computing capacity provided by capacity supporting equipment 111 (e.g., the amount of overclocking, the amount of increase in supply voltage, the amount by which the maximum acceptable temperature is raised, or the like) may be selected or configured based on the amount of additional computing capacity needed to handle the emergency peak capacity condition and, similarly, the management actions initiated to increase the cooling that is provided by environmental equipment 116 may be selected or configured based on the management actions taken to increase the computing capacity supporting equipment 111 capacity provided by capacity supporting equipment 111.

In at least some embodiments, management system 120 is configured to initiate one or more capacity-based management actions for increasing the computing capacity provided by capacity supporting equipment 111 without initiating any environmental-based management actions for increasing cooling provided by environmental equipment 116 in order to offset the increase in temperatures resulting from increasing the computing capacity provided by capacity supporting equipment 111 (or at least not initiating environmental-based management actions sufficient to adequately offset the increase in temperatures resulting from increasing the computing capacity provided by capacity supporting equipment 111). The use of one or more capacity-based management actions without any (or without sufficient) corresponding environmental-based management actions may be performed based on one or more of an indication that the capacity supporting equipment 111 requiring the additional computing capacity is scheduled or expected to be replaced (e.g., it may not be beneficial to incur the additional cost of increasing cooling provided by environmental equipment 116 since the capacity supporting equipment 111 is scheduled or expected to be replaced anyway), an indication that the remaining useful service life of the capacity supporting equipment 111 requiring the additional computing capacity is below a threshold (e.g., such that, again, it may not be beneficial to incur the additional cost of increasing cooling provided by environmental equipment 116 since the capacity supporting equipment 111 is expected to fail soon anyway), a cost/benefit analysis of the risk to the capacity supporting equipment 111 (e.g., depending on how much harder, or how much farther outside of normal operating ranges, the capacity supporting equipment 111 is to be pushed, and for how long) versus the cost of increasing cooling provided by environmental equipment 116 (e.g., in terms of operational costs, risk to the reliability or useful service life of environmental equipment 116, or the like), or the like, as well as various combinations thereof.

In at least some embodiments, management system 120 is configured to concentrate computing capacity associated with emergency peak capacity conditions (and, thus, use of capacity-based management actions) on a select subset of capacity supporting equipment 111. This may increase the risk of reliability problems with the select subset of capacity supporting equipment 111 and the risk of reductions in the useful service life of the select subset of capacity supporting equipment 111, but ensures that other portions of the capacity supporting equipment 111 are not subject to the same risks. In other words, rather than operating all capacity supporting equipment 111 in the emergency operating mode in order to handle emergency peak capacity conditions (thereby putting all of the capacity supporting equipment 111 at risk of reliability problems, needing extraordinary maintenance actions, reductions in useful service life, and so forth), only a subset of the capacity supporting equipment 111 is operated in the emergency operating mode in order to handle emergency peak capacity conditions (and, thus, only a subset of the capacity supporting equipment 111 is subject to increased risk of reliability problems, needing extraordinary maintenance actions, reductions in useful service life, and so forth).

In at least some embodiments, in which management system 120 concentrates computing capacity associated with emergency peak capacity conditions (and, thus, use of capacity-based management actions) on a select subset of capacity supporting equipment 111, the subset of capacity supporting equipment 111 that is used may be selected dynamically. For example, where management system 120 detects a first emergency capacity event associated with a first server and configures the first server to handle the first emergency capacity event (e.g., via a message to configure the first server to support additional computing capacity and, optionally, a message to configure an active cooling element of the first server to reduce the temperature at the server), upon detection of a second emergency capacity event associated with a second server, management system 120 may direct the capacity associated with the second capacity event to the first server (rather than the second server) to be handled by the first server since the first server is already being pushed harder to handle the first emergency peak capacity condition (i.e., the first server is already configured to provide additional computing capacity and the active cooling mechanism is already configured to dissipate the additional heat associated with providing the additional computing capacity). For example, where management system 120 detects a first emergency capacity event associated with a first server of a first server rack 112, configures the first server to handle the emergency capacity event (e.g., via a message to configure the server to support additional computing capacity), and configures a cooling mechanism in the vicinity of the first server to dissipate the additional heat associated with providing of the additional computing capacity by the first server (e.g., increasing the fan speed of a fan directed at an aisle associated with the first server rack 112), upon detection of a second emergency capacity event associated with a second server in a second server rack 112 that is not cooled by the fan directed at an aisle associated with the first server rack 112, management system 120 may direct the capacity associated with the second capacity event to a second server that is located in the first server rack 112 that is cooled by the fan directed at an aisle associated with the first server rack 112 (i.e., each of the servers of the first server rack 112 is already being further cooled due to the increase in the fan speed of the fan directed at an aisle associated with the first server rack 112, such that it is possible to take advantage of this additional cooling to enable the second server that is located in the first server rack 112 to handle the second emergency capacity event without incurring the additional cost of providing additional cooling that otherwise would be required in order to enable the second server of the second server rack 112 to handle the second emergency capacity event).

In at least some embodiments, in which management system 120 concentrates computing capacity associated with emergency peak capacity conditions (and, thus, use of capacity-based management actions) on a select subset of capacity supporting equipment 111, the subset of capacity supporting equipment 111 that is used may be preselected. For example, one server of the capacity supporting equipment 111 may be selected as the server that may be configured by management system 120 to operate in emergency operating mode to handle emergency capacity events, a set of one or more servers of a single server rack 112 may be selected as the servers that may be configured by management system 120 to operate in emergency operating mode to handle emergency capacity events, one or more servers of each server rack 112 may be selected as the server(s) that may be configured by management system 120 to operate in emergency operating mode to handle emergency capacity events associated with those respective server racks 112, or the like, as well as various combinations thereof. For example, where management system 120 selects a single server to handle emergency capacity events, management server 120 may direct traffic associated with emergency capacity events to that selected server until a determination is made that a new server needs to be designated to handle emergency capacity events (e.g., based on a determination that the original server has operated as the designated server for emergency capacity events for a threshold length of time (e.g., continuing to operate the server in emergency operational mode will or is likely to result in an error or permanent damage to the server), based on a determination that the original server cannot provide any additional computing capacity even while operating in the emergency capacity mode such that one or more additional servers is need in order to handle additional emergency capacity events, or the like). For example, where management system 120 selects a multiple servers to handle emergency capacity events, management server 120 may direct traffic associated with the emergency capacity events to the selected servers in various ways (e.g., based on one or more load balancing techniques for balancing load across the servers (e.g., in a round-robin manner, based on hashing on traffic associated with the emergency capacity events, or the like), based on traffic types associated with the emergency capacity events, based on the customers with which the emergency capacity events are associated, or the like, as well as various combinations thereof).

In at least some embodiments, management system 120 is configured to distribute computing capacity associated with emergency peak capacity conditions (and, thus, use of capacity-based management actions) across the capacity supporting equipment 111 or portions of the capacity supporting equipment 111. This may increase the risk exposure in terms of the quantity of capacity supporting equipment 111 facing risks associated with handling of emergency capacity events (e.g., risk of reliability problems, risk of the need for use of extraordinary maintenance actions, risk of reductions in useful service life, or the like), while reducing the probability that any particular portion of capacity supporting equipment 111 actually experiences such problems. In other words, rather than operating a small subset of the capacity supporting equipment 111 in the emergency operating mode in order to handle emergency capacity events (thereby putting that subset of the capacity supporting equipment 111 at a higher risk than if emergency capacity events were more distributed across a larger subset of the capacity supporting equipment 111 or even the full set of the capacity supporting equipment 111), a large subset of the subset of the capacity supporting equipment 111 or even the full set of the capacity supporting equipment 111 may be operated in the emergency operating mode in order to handle emergency capacity events (and, thus, no single portion of the capacity supporting equipment 111 is subject to excessive risk in order to handle emergency capacity events).

In at least some embodiments, in which management system 120 distributes computing capacity associated with emergency peak capacity conditions (and, thus, use of capacity-based management actions) across capacity supporting equipment 111, the distribution of the computing capacity associated with emergency peak capacity conditions may be performed dynamically. For example, where management system 120 detects a first emergency capacity event associated with a first server and configures the first server to handle the first emergency capacity event (e.g., via a message to configure the first server to provide additional computing capacity and, optionally, a message to configure environmental equipment 116 associated with the first server to provide increased cooling for the first server), upon detection of a second emergency capacity event associated with the first server, management system 120, rather than using the first server to handle the second emergency capacity event, may select a second server to handle the emergency capacity event and may configure the second server to handle the second emergency capacity event (e.g., via a message to configure the second server to provide additional computing capacity and, optionally, a message to configure environmental equipment 116 associated with the second server to provide increased cooling for the second server) so as to distribute the emergency capacity events across different server (e.g., so that no single server is pushed too far outside of its normal operating mode).

In at least some embodiments, in which management system 120 distributes computing capacity associated with emergency peak capacity conditions (and, thus, use of capacity-based management actions) across capacity supporting equipment 111, the capacity supporting equipment 111 that is used may be preselected. For example, where management system 120 detects a first emergency capacity event associated with a first server and configures the first server to handle the first emergency capacity event (e.g., via a message to configure the first server to provide additional computing capacity and, optionally, a message to configure environmental equipment 116 associated with the first server to provide increased cooling for the first server), upon detection of a second emergency capacity event associated with the first server, management system 120, rather than using the first server to handle the second emergency capacity event, may configure a preselected second server to handle the second emergency capacity event (e.g., via a message to configure the second server to provide additional computing capacity and, optionally, a message to configure environmental equipment 116 associated with the second server to provide increased cooling for the second server) so as to distribute the emergency capacity events across different server (e.g., so that no single server is pushed too far outside of its normal operating mode).

It will be appreciated that various combinations of embodiments for concentration of emergency peak capacity conditions and embodiments for distribution of emergency peak capacity conditions may be used together. For example, handling of emergency peak capacity conditions may be concentrated within a particular datacenter of a set of available datacenters and then distributed within that datacenter, handling of emergency peak capacity conditions may be concentrated within a particular server rack of a datacenters and then distributed across the servers of the server rack, handling of emergency peak capacity conditions may be distributed across multiple server racks of a datacenter and then concentrated on servers within the respective server racks, or the like. For example, concentrating handling of emergency peak capacity conditions within a zone or a set of zones handled by particular environmental equipment 116 (e.g., a server rack or set of server racks being cooled by a particular air conditioning unit or set of air conditioning units), but distributing computing capacity of the emergency peak capacity conditions across the set of capacity supporting equipment 111 associated with the particular environmental equipment 116 (e.g., distributing computing capacity of the emergency peak capacity conditions across servers within the server rack or set of server racks being cooled by a particular fan or set of fans). It will be appreciated that other combinations of embodiments for concentration of emergency peak capacity conditions and embodiments for distribution of emergency peak capacity conditions may be used together.

It will be appreciated that various embodiments of concentration of emergency peak capacity conditions or various embodiments of distribution of emergency peak capacity conditions may rely on various techniques for controlling handling of traffic by the cloud computing infrastructure (e.g., traffic load balancing techniques, rerouting of traffic, or the like, as well as various combinations thereof). The techniques for controlling handling of traffic using cloud computing infrastructure may be applied to traffic associated with an emergency capacity event (e.g., redirecting the traffic of the emergency capacity event from a first server to a second server where the second server will handle the additional traffic from the emergency capacity event), traffic that is not associated with an emergency capacity event (e.g., redirecting traffic that is not associated with the emergency capacity event from a first server to a second server where the first server will handle the additional traffic from the emergency capacity event), or the like, as well as various combinations thereof. The techniques for controlling handling of traffic may be applied for various reasons, such as the necessity or desirability of one or more of different sets of traffic being handled together on the same capacity supporting equipment or separately on different capacity supporting equipment (e.g., traffic of particular customers, traffic types of particular cloud-based services that are supported, or the like, as well as various combinations thereof), for load balancing purposes, or the like, as well as various combinations thereof. The techniques for controlling handling of traffic may be controlled by the management system, by one or more other systems in conjunction with management system 120, or the like, as well as various combinations thereof.

The management system 120 may be configured to initiate various types of management actions for configuring capacity supporting equipment 111 to eliminate the additional computing capacity provided for the emergency peak capacity condition based on a determination that the additional computing capacity provided for the emergency peak capacity condition is no longer needed by cloud computing infrastructure 110. For example, the management actions may include one or more management actions for configuring capacity supporting equipment 111 to return from emergency operating mode to normal operating mode (e.g., returning from overclocking to normal clocking, lowering a supply voltage to its normal level, lowering a maximum acceptable temperature to its normal level, or the like), one or more management actions for configuring environmental equipment 116 to return from emergency operating mode to normal operating mode (e.g., changing a thermostat from a lower temperature to a normal temperature, changing a fan speed of a fan from an increased speed to a normal speed, or the like), or various combinations thereof. The management system 120 may be configured to initiate various other types of management actions for configuring the cloud computing infrastructure to return from an emergency operating mode to a normal operating mode.

Figure 2:
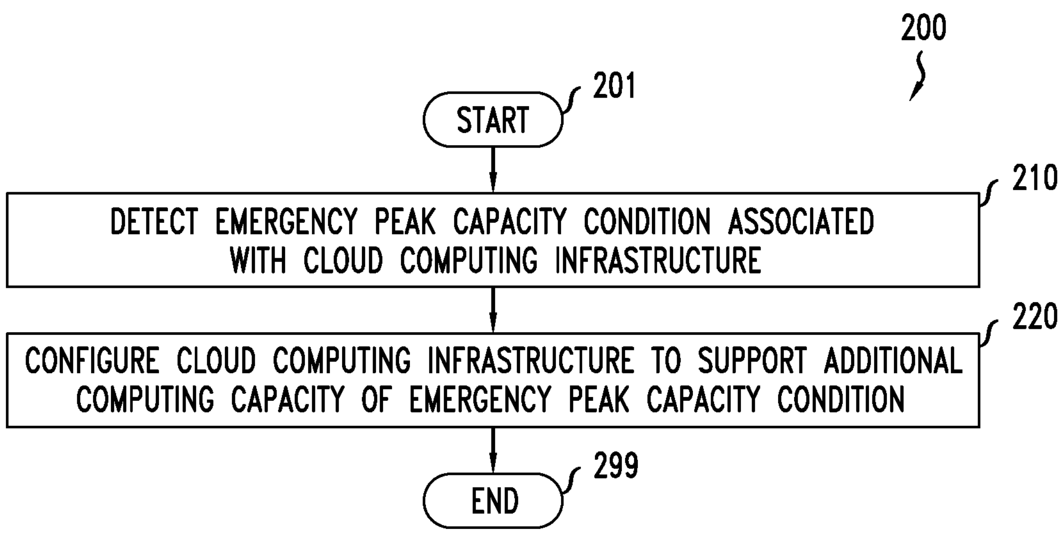
FIG. 2 depicts a method for handling an emergency peak capacity condition for cloud computing infrastructure.

FIG. 2 depicts a method for handling an emergency peak capacity condition for cloud computing infrastructure. It will be appreciated that, although primarily presented herein as being performed serially, at least a portion of the steps of method 200 may be performed contemporaneously or in a different order than as presented in FIG. 2. At step 201, method 200 begins. At step 210, an emergency peak capacity condition associated with cloud computing infrastructure is detected. At step 220, the cloud computing infrastructure is configured to support additional computing capacity of the emergency peak capacity condition. The configuration of the cloud computing infrastructure to support additional computing capacity of the emergency peak capacity condition may include configuration of an element(s) of capacity supporting equipment to support additional computing capacity of the emergency peak capacity condition and, optionally, configuration of an element(s) of environmental equipment to support operation of capacity supporting equipment to support additional computing capacity of the emergency peak capacity condition. At step 299, method 200 ends. It will be appreciated that method 200 of FIG. 2 may be further understood when considered in conjunction with FIG. 1.

It will be appreciated that various embodiments of the capability for management of cloud computing infrastructure under emergency peak capacity conditions may provide various advantages. Various embodiments of the capability for management of cloud computing infrastructure under emergency peak capacity conditions may enable emergency peak capacity conditions to be handled by cloud computing infrastructure that is engineered to normal peak capacity conditions rather than engineered to emergency peak capacity conditions, thereby enabling the cloud computing infrastructure provider to deploy less cloud computing infrastructure equipment (which provides capital expenditure savings and also provides operational expenditure savings under normal peak capacity conditions) and to push the cloud computing infrastructure equipment harder during emergency peak capacity conditions (which are expected to be both relatively rare and relatively short-lived as compared to operations under normal peak capacity conditions). Various embodiments of the capability for management of cloud computing infrastructure under emergency peak capacity conditions, by obviating the need to engineer the cloud computing infrastructure to handle emergency peak capacity conditions, may obviate the situation in which significant portions of cloud computing infrastructure equipment are idle and, thus, wasted, during normal peak capacity conditions and are only used during relatively rare and relatively short-lived emergency peak capacity conditions (assuming that such conditions even occur at all).

It will be appreciated that, although primarily depicted and described herein with respect to embodiments of the capability for management of cloud computing infrastructure under emergency peak capacity conditions in which capacity management is used to manage capacity for cloud computing infrastructure that is engineered to handle normal peak capacity conditions rather than emergency peak capacity conditions, various embodiments of the capability for management of cloud computing infrastructure under emergency peak capacity conditions may be used to manage capacity for cloud computing infrastructure that is engineered to handle emergency peak capacity conditions but where the cloud computing infrastructure also includes additional capacity supporting equipment. Here, the additional capacity supporting equipment may be deployed within the location(s) at which the cloud computing infrastructure is deployed, but may not be activated such that it may not be considered to represent engineering of the cloud computing infrastructure at a level above engineering for normal peak capacity conditions. Rather, the additional capacity supporting equipment may be considered to be "dark" capacity that may be activated dynamically to provide additional computing capacity for responding to emergency peak capacity conditions. The activation of the "dark" capacity may be controlled using one or more management actions from the management system that is configured to support various embodiments of the capability for management of cloud computing infrastructure under emergency capacity conditions.

It will be appreciated that, although primarily depicted and described herein with respect to embodiments of the capability for management of cloud computing infrastructure under emergency peak capacity conditions in which capacity management is used to manage capacity for cloud computing infrastructure that is engineered to handle normal peak capacity conditions rather than emergency peak capacity conditions, various embodiments of the capability for management of cloud computing infrastructure under emergency peak capacity conditions may be used to manage capacity for cloud computing infrastructure that is engineered to handle emergency peak capacity conditions but where the cloud computing infrastructure also includes additional environmental equipment, additional power equipment, or the like, as well as various combinations thereof. Here, the additional equipment may be deployed within the location(s) at which the cloud computing infrastructure is deployed. For example, emergency cooling support may be provided by releasing a supercooling gas (e.g., which could be released once or a limited number of times) to give a temporary boost in cooling (e.g., in a server, a server rack, an aisle, or the like). For example, emergency power support may be provided in the form of one or more backup generators with the risk that if there is a power cut some of the equipment may shut down prematurely (no clean shutdown). It will be appreciated that such additional environmental and power equipment could be used to support running of capacity supporting equipment in emergency operating mode, to support dark capacity, or the like, as well as various combinations thereof.

It will be appreciated that activation of "dark" capacity may be performed in place of or in addition to other types of management actions which may be used to provide additional computing capacity for emergency peak capacity conditions as discussed above.

Figure 3:
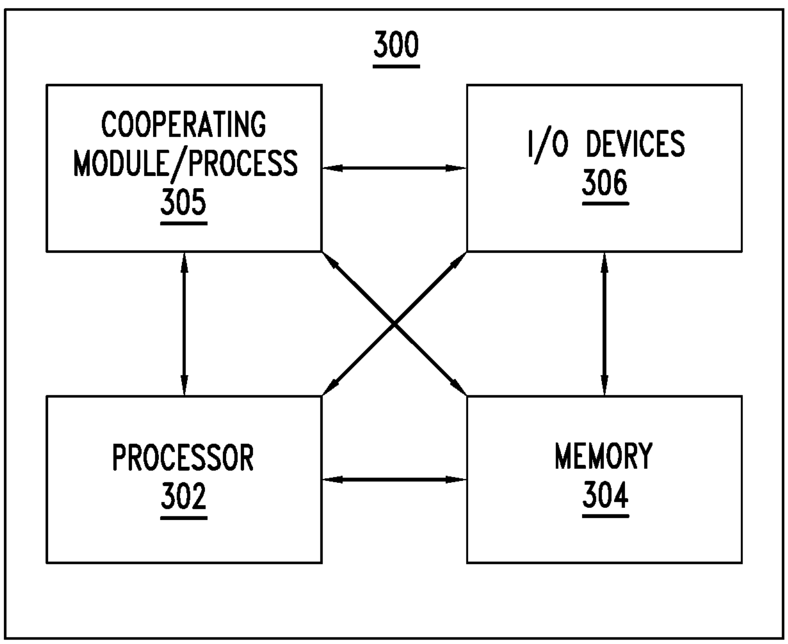
FIG. 3 depicts a high-level block diagram of a computer suitable for use in performing functions presented herein.

It will be appreciated that, although primarily depicted and described herein with respect to embodiments of the capability for management of cloud computing infrastructure under emergency peak capacity conditions in which capacity management is used to manage capacity for cloud computing infrastructure that is engineered to handle normal peak capacity conditions rather than emergency peak capacity conditions, various embodiments of the capability for management of cloud computing infrastructure under emergency peak capacity conditions may be used to manage capacity for cloud computing infrastructure that is engineered to handle emergency peak capacity conditions rather than normal peak capacity conditions. Various embodiments of the capability for management of cloud computing infrastructure under emergency peak capacity conditions may be useful within the context of cloud computing infrastructure that is engineered to handle emergency peak capacity conditions. For example, it may be more cost effective to push capacity supporting equipment harder in order to support an emergency peak capacity condition, even though spare capacity supporting equipment is available for handling the emergency peak capacity condition, where costs associated with the risk of pushing the capacity supporting equipment harder are determined to be less than the cost of redirecting traffic associated with the emergency peak capacity condition to the spare capacity supporting equipment (e.g., the capacity supporting equipment that is being pushed harder is scheduled to be replaced, such that burnout of the capacity supporting equipment by pushing it harder is determined to be an acceptable risk). It will be appreciated that this is merely one example of a situation in which various embodiments of the capability for management of cloud computing infrastructure under emergency peak capacity conditions may be useful within the context of cloud computing infrastructure that is engineered to handle emergency peak capacity conditions. FIG. 3 depicts a high-level block diagram of a computer suitable for use in performing functions described herein.

The computer 300 includes a processor 302 (e.g., a central processing unit (CPU) or other suitable processor(s)) and a memory 304 (e.g., random access memory (RAM), read only memory (ROM), or the like).

The computer 300 also may include a cooperating module/process 305. The cooperating process 305 can be loaded into memory 304 and executed by the processor 302 to implement functions as discussed herein and, thus, cooperating process 305 (including associated data structures) can be stored on a computer readable storage medium, e.g., RAM memory, magnetic or optical drive or diskette, and the like.

The computer 300 also may include one or more input/output devices 306 (e.g., a user input device (such as a keyboard, a keypad, a mouse, and the like), a user output device (such as a display, a speaker, and the like), an input port, an output port, a receiver, a transmitter, a transceiver, a networking device, one or more storage devices (e.g., a tape drive, a floppy drive, a hard disk drive, a compact disk drive, and the like), or the like, as well as various combinations thereof).

It will be appreciated that computer 300 depicted in FIG. 3 provides a general architecture and functionality suitable for implementing functional elements described herein and/or portions of functional elements described herein. For example, computer 300 provides a general architecture and functionality suitable for implementing one or more of an element of capacity supporting equipment 111, an element of environmental equipment 116, management system 120, a portion of management system 120, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

at least one processor; and at least one memory including computer program code;

wherein the at least one memory and the computer program code are configured to, with the at least one processor, cause the apparatus to at least:

detect, for a computing environment including capacity supporting equipment and environmental equipment, first and second capacity conditions associated with respective first and second elements of the capacity supporting equipment;

initiate handling of the first capacity condition, by the first element of the capacity supporting equipment, including sending a message for configuring the first element of the capacity supporting equipment to provide additional computing capacity for the first capacity condition and sending a message for configuring an element of the environmental equipment to provide additional cooling for the first element of the capacity supporting equipment; and initiate handling of the second capacity condition, by the first element of the capacity supporting equipment or a third element of the capacity supporting equipment, based on the handling of the first capacity condition.

2. The apparatus of claim 1, wherein the handling of the second capacity condition is by the first element of the capacity supporting equipment.

3. The apparatus of claim 2, wherein the first element of the capacity supporting equipment is selected to handle the second capacity condition based on a determination that the first element of the capacity supporting equipment is scheduled or expected to be replaced.

4. The apparatus of claim 2, wherein the first element of the capacity supporting equipment is selected to handle the second capacity condition based on a determination that a remaining useful service life of the first element of the capacity supporting equipment is below a threshold.

5. The apparatus of claim 2, wherein, to initiate handling of the second capacity condition by the first element of the capacity supporting equipment, the at least one memory and the computer program code are configured to, with the at least one processor, cause the apparatus to at least:

send a second message for configuring the first element of the capacity supporting equipment to provide additional computing capacity for the second capacity condition.

6. The apparatus of claim 1, wherein the handling of the second capacity condition is by the third element of the capacity supporting equipment.

7. The apparatus of claim 6, wherein the third element of the capacity supporting equipment is selected to handle the second capacity condition based on its proximity to the first element of the capacity supporting equipment.

8. The apparatus of claim 7, wherein the third element of the capacity supporting equipment is receiving at least a portion of the additional cooling from the element of the environmental equipment.

9. The apparatus of claim 6, wherein, to initiate handling of the second capacity condition by the third element of the capacity supporting equipment, the at least one memory and the computer program code are configured to, with the at least one processor, cause the apparatus to at least:

send a message for configuring the third element of the capacity supporting equipment to provide additional computing capacity for the second capacity condition.

10. The apparatus of claim 1, wherein, to initiate handling of the first capacity condition by the first element of the capacity supporting equipment, the at least one memory and the computer program code are configured to, with the at least one processor, cause the apparatus to at least:

send a message configured to trigger a change of the first element of the capacity supporting equipment from operating in a normal operating mode to operating in an emergency operating mode.

11. The apparatus of claim 10, wherein the change of the first element of the capacity supporting equipment from operating in the normal operating mode to operating in the emergency operating mode comprises at least one of configuring the first element of the capacity supporting equipment to perform overclocking, raising a supply voltage of the first element of the capacity supporting equipment, or raising a maximum acceptable temperature of the first element of the capacity supporting equipment.

12. The apparatus of claim 1, wherein, to initiate handling of the first capacity condition by the first element of the capacity supporting equipment, the at least one memory and the computer program code are configured to, with the at least one processor, cause the apparatus to at least:

send a message for configuring an active cooling mechanism of the first element of the capacity supporting equipment to provide additional cooling for the first element of the capacity supporting equipment.

13. The apparatus of claim 1, wherein the message for configuring the element of the environmental equipment to provide additional cooling for the first element of the capacity supporting equipment is configured for at least one of adjusting an operating parameter of a controller of an air conditioning system, adjusting an operating parameter of a controller of a coolant circulation system, or adjusting an operating parameter of a controller of a fan.

14. A method, comprising:

detecting, for a computing environment including capacity supporting equipment and environmental equipment, first and second capacity conditions associated with respective first and second elements of the capacity supporting equipment;

initiating handling of the first capacity condition, by the first element of the capacity supporting equipment, including sending a message for configuring the first element of the capacity supporting equipment to provide additional computing capacity for the first capacity condition and sending a message for configuring an element of the environmental equipment to provide additional cooling for the first element of the capacity supporting equipment; and initiating handling of the second capacity condition, by the first element of the capacity supporting equipment or a third element of the capacity supporting equipment, based on the handling of the first capacity condition.

15. An apparatus, comprising:

at least one processor; and at least one memory including computer program code;

wherein the at least one memory and the computer program code are configured to, with the at least one processor, cause the apparatus to at least:

detect, for a computing environment including capacity supporting equipment, first and second capacity conditions associated with respective first and second elements of the capacity supporting equipment;

initiate handling of the first capacity condition, by the first element of the capacity supporting equipment, including sending at least one message for configuring the first element of the capacity supporting equipment to provide additional computing capacity for the first capacity condition and for configuring an active cooling mechanism of the first element of the capacity supporting equipment to provide additional cooling for the first element of the capacity supporting equipment; and initiate handling of the second capacity condition by the first element of the capacity supporting equipment based on the handling of the first capacity condition.

16. The apparatus of claim 15, wherein the handling of the first capacity condition by the first element of the capacity supporting equipment is initiated based on a determination that the first element of the capacity supporting equipment is scheduled or expected to be replaced.

17. The apparatus of claim 15, wherein the handling of the first capacity condition by the first element of the capacity supporting equipment is initiated based on a determination that a remaining useful service life of the first element of the capacity supporting equipment is below a threshold.

18. The apparatus of claim 15, wherein configuring the first element of the capacity supporting equipment to provide additional computing capacity for the first capacity condition comprises at least one of configuring the first element of the capacity supporting equipment to perform overclocking, raising a supply voltage of the first element of the capacity supporting equipment, or raising a maximum acceptable temperature of the first element of the capacity supporting equipment.

19. The apparatus of claim 15, wherein the handling of the second capacity condition by the first element of the capacity supporting equipment is initiated based on a determination that the first element of the capacity supporting equipment is scheduled or expected to be replaced.

20. The apparatus of claim 15, wherein the handling of the second capacity condition by the first element of the capacity supporting equipment is initiated based on a determination that a remaining useful service life of the first element of the capacity supporting equipment is below a threshold.

21. The apparatus of claim 15, wherein, to initiate handling of the second capacity condition by the first element of the capacity supporting equipment, the at least one memory and the computer program code are configured to, with the at least one processor, cause the apparatus to at least:

send a second message for configuring the first element of the capacity supporting equipment to provide additional computing capacity for the second capacity condition.

22. A method, comprising:

detecting, for a computing environment including capacity supporting equipment, first and second capacity conditions associated with respective first and second elements of the capacity supporting equipment;

initiating handling of the first capacity condition, by the first element of the capacity supporting equipment, including sending at least one message for configuring the first element of the capacity supporting equipment to provide additional computing capacity for the first capacity condition and for configuring an active cooling mechanism of the first element of the capacity supporting equipment to provide additional cooling for the first element of the capacity supporting equipment; and initiating handling of the second capacity condition by the first element of the capacity supporting equipment based on the handling of the first capacity condition.

* * * * *